United States Patent [19]

Maeda et al.

[11] Patent Number: 5,748,588
[45] Date of Patent: May 5, 1998

[54] MEMORY CONTROLLER AND RECORDING APPARATUS WHICH ADDS DUMMY DATA TO COMPLETE A SECTOR OF DATA WHEN WRITING TO MEMORY

[75] Inventors: Yasuaki Maeda, Kanagawa; Kosuke Nakamura, Tokyo, both of Japan

[73] Assignee: Sony Corporation, Tokyo, Japan

[21] Appl. No.: 840,012

[22] Filed: Apr. 24, 1997

Related U.S. Application Data

[63] Continuation of Ser. No. 526,945, Sep. 12, 1995, abandoned.

[30] Foreign Application Priority Data

Sep. 20, 1994 [JP] Japan ................. 6-250209

[51] Int. Cl.[6] ................................................ G11B 3/90
[52] U.S. Cl. ................................................ 369/54
[58] Field of Search ........................ 369/47, 48, 50, 369/54, 58, 59, 60, 32

[56] References Cited

U.S. PATENT DOCUMENTS 5,224,087  6/1993  Maeda et al. ............................ 369/54
5,453,967  9/1995  Aramaki et al. ...................... 369/54 X

*Primary Examiner*—Paul W. Huber
*Attorney, Agent, or Firm*—Limbach & Limbach L.L.P.

[57] ABSTRACT

A processing load of a microcomputer can be alleviated. A memory controller 12 for storing input data ADTI in units of the predetermined data amount comprises dummy data generating means 34, selector means 31 and selector control means 32. The selector control means 32 switches the selector means 31, if the supply of the input data ADTI is stopped before the amount of input data reaches a predetermined data amount unit while the input data ADTI is being supplied to the memory 13 through the selector means 31, to a control in such a manner that a dummy data Null from the dummy data generating means 34 is supplied to the memory 13 until the total amount of data reaches the predetermined data amount unit.

3 Claims, 4 Drawing Sheets

MEMORY CONTROLLER AND RECORDING APPARATUS WHICH ADDS DUMMY DATA TO COMPLETE A SECTOR OF DATA WHEN WRITING TO MEMORY

This is a continuation of application Ser. No. 08/526,945 filed on Sep. 12, 1995, now abandoned.

BACKGROUND OF THE INVENTION

1. Field of the Invention

The present invention relates to a memory controller for storing input data to memory and a recording apparatus for recording data such as audio data to a recording medium such as an optical disc, etc.

2. Description of Related Art

A variety of digital data recording media have been put into practical use in recent years. For example, reproduction-only systems utilizing an optical disc such as a compact disc system and a minidisc (registered trademark) system with which a user can record or reproduce audio data to or from a recording medium such as a magneto-optical disc are already proposed as the typical ones.

In the minidisc recording apparatus, input data is once stored in buffer memory. The data is then read in the predetermined timing from the buffer memory and is supplied to a recording head for recording the data into a disc.

In the case of a minidisc system, a recording data unit which is defined as the amount of minimum recording data of the data to be recorded into a disc and a write/read data unit which is defined as the amount of data to be written or read to or from a buffer memory.

A data format in the minidisc system is formed in units of one cluster CL (=36 sectors) consisting of a subdata region of four (4) sectors (one sector=2352 bytes) and a main data region of 32 sectors as shown in FIG. 4. Amount of data of one cluster is defined as the amount of minimum recording data during recording to the disc, namely the recording data unit. One cluster corresponds to two to three circular tracks. An address is recorded for every one sector.

Moreover, input data is stored once in a buffer memory. However, in this case, a write/read operation is conducted in units of one sector.

In FIG. 4, the subdata region consisting of four sectors is mainly used as a linking area and TOC data or audio data is recorded in the main data region consisting of 32 sectors.

A sector is further divided into sound groups, and two sectors are divided into 11 sound groups (SGs). In each sound group, the data of 512 samples are recorded in separation to two sound frames (SFs) of L channel and R channel. One sound group (SG) defines amount of audio data corresponding to the period of 11.6 ms.

Here, the input data is once stored in buffer memory in units of sectors, but if the operation such as the recording operation is stopped or data output from the data source is stopped at a certain timing, the amount of input data to be stored in the buffer memory does not often reach the amount of one sector at this timing.

Since storing of the input data to the buffer memory is persistently performed in units of one sector, a microcomputer which is controlling the recording operation would have to generate, in this case, dummy data corresponding to the amount of data less than that of one sector to also store the dummy data to the buffer memory following the last input data.

However, execution of such processes would result in problems that the processing load of the microcomputer increases and execution of the other various controls is restricted. Moreover, there rises a problem that program design of the microcomputer will become difficult.

SUMMARY OF THE INVENTION

The present invention has been proposed considering such problems and it is therefore an object of the present invention to alleviate the processing load of the microcomputer.

For this purpose, a memory controller for storing data to the memory in units of the predetermined amount of data is provided with dummy data generating means, selector means and selector control means.

Here, the selector means is given the function to selectively supply input data and dummy data from the dummy data generating means to the memory.

The selector control means switches the selector means, if supply of the input data is stopped before the amount of input data does not reach the predetermined data amount unit while the input data is being supplied to the memory through the selector means, in order to control the selector means so that the dummy data is supplied to the memory from the dummy data generating means until the total data amount reaches the predetermined data amount unit.

Moreover, in a recording apparatus where input data is taken into memory means in units of the predetermined data amount and then stored therein by way of memory control means and data is then read from the memory means and is then supplied to a recording head for recording on a recording medium, the memory control means is structured as explained hereunder.

That is, the memory control means comprises a dummy data generator, selectors and a selector controller.

The selector has a function to selectively supply input data and dummy data generated from a dummy data generator to the storing means, while the selector controller has a function to switch the selector, if supply of input data is stopped before it does not reach the predetermined data amount unit while the input data is being supplied to the memory means through the selector, in order to supply the dummy data from the dummy data generator until the total amount of data reaches the predetermined data amount unit.

The memory controller formed in such a structure explained above can always maintain the amount of the data to be stored in the memory (storing means) to the predetermined data unit. Therefore, the microcomputer can be freed, during the storing operation, from execution of the processing to maintain the amount of data to the predetermined amount using such dummy data.

DESCRIPTION OF THE PREFERRED EMBODIMENT

Figure 2:
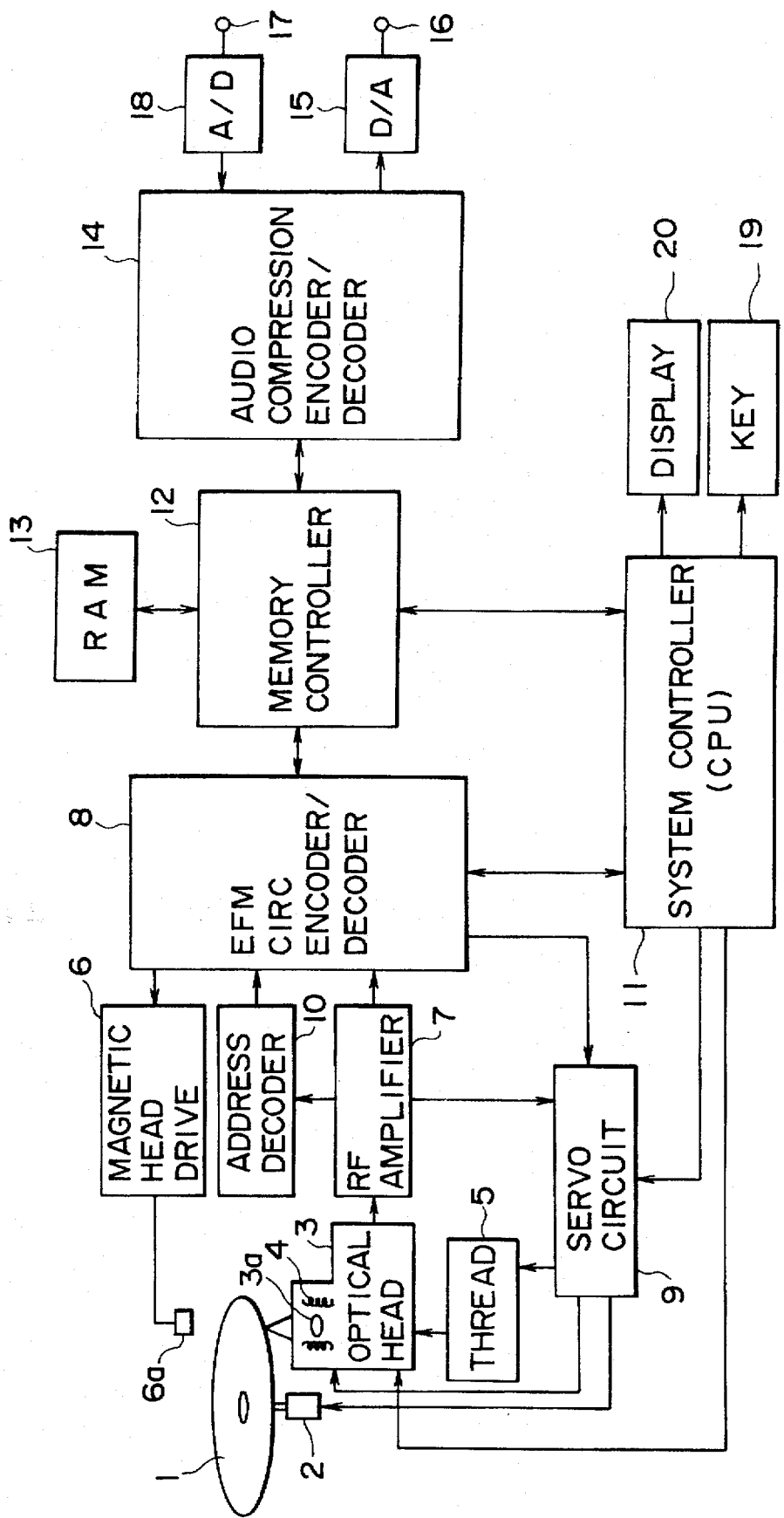
FIG. 2 is a block diagram of a recording and reproducing apparatus in which a sync detection apparatus of the preferred embodiment is loaded.

A recording and reproducing apparatus comprising a memory control apparatus (memory controller) as a preferred embodiment of the present invention will be explained hereinafter. FIG. 2 is a block diagram of a recording and reproducing apparatus (minidisc recording and reproducing apparatus).

In FIG. 2, the reference numeral 1 designates a magneto-optical disc which is rotated by a spindle motor 2; 3, an optical head for irradiating the disc 1 with a laser beam during the recording/reproducing operation. The optical head provides a high level laser output to a magneto-optical disc, for the recording operation, to heat a recording track up to the Curie temperature and also provides a comparatively low level laser output, for the reproducing operation, to detect the data from a reflected laser beam by means of a magnetic Kerr effect.

For the data read operation from a disc 1, the optical head 3 is also provided with a laser diode as laser output means, a deflection beam splitter, an optical system consisting of an objective lens, etc. and a detector for detecting a reflected laser beam. The objective lens 3a is held by a 2-axis mechanism to be movable in the disc radius direction and in the direction to make access to and to be separated from the disc. Moreover, the optical head 3 as a whole is provided to be movable in the disc radius direction by means of a thread mechanism 5.

6a designates a magnetic head which is located opposed to the optical head 3 behind the disc 1 for impressing a magnetic field modulated by the data supplied to a magneto-optical disc. The magnetic head 6a can be moved in the disc radius direction by means of the thread mechanism 5 together with the optical head 3.

The information detected by the optical head 3 from the disc 1 through the reproducing operation is then supplied to an RF amplifier 7. The RF amplifier 7 extracts a reproduced RF signal, a tracking error signal, a focus error signal and groove information (information of wobbling grooves on the magneto-optical disc 1), etc. through the arithmetic processing of the information supplied. The reproduced RF signal extracted is then supplied to an encoder/decoder 8. Moreover, the tracking error signal and focus error signal are supplied to a servo circuit 9.

The servo circuit 9 generates a variety of servo drive signals with the tracking error signal and focus error signal supplied and a track-jump command and an access command sent from a system controller 11 in order to perform the focus and tracking controls by controlling the 2-axis mechanism 4 and thread mechanism 5.

Moreover, the spindle motor 2 is controlled to a constant line velocity (CLV), using groove information and a clock of the groove address decoded from such groove information. Moreover, the spindle motor 2 is controlled to be driven or stopped with control signals such as spindle kick and spindle brake from the system controller 11.

The reproduced RF signal undergoes the decoding processes such as EFM demodulation and CIRC, etc. in the encoder/decoder 8 and is once written into a buffer RAM 13 by means of the memory controller 12. Data read from the magneto-optical disc 1 by the optical head 3 and transfer of reproduced data to the buffer RAM 13 from the optical head 3 are performed (intermittently) at a rate of 1.41 Mb/s.

The data written into the buffer RAM 13 is read in the timing that the reproduced data is transferred at a rate of 0.3 Mb/s and is then supplied to the encoder/decoder 14. The data is further subject to the processing for the reproduced signal such as the decoding process, etc. against the audio compression process, converted to an analog signal by a D/A converter 15, supplied to the predetermined amplifier circuit from a terminal 16 and is then provided as the reproduced outputs, for example, the L-channel and R-channel audio signals.

As explained above, the data read from the disc 1 is once written intermittently at a higher rate into the buffer RAM 13 and is read at a lower rate to provide an audio output. Thereby, the so-called shock-proof function that an audio output is provided continuously without any intermission even if the tracking servo function is temporarily lost, disabling the data read operation from the disc 1 can be realized.

An address decoder 10 outputs a groove address by executing the FM demodulation and bi-phase decoding to the groove information supplied from the RF amplifier 7. This groove address and address information decoded by the encoder/decoder 8 are supplied to the system controller 11 through the encoder/decoder 8 and are used for a variety of control operations.

When the recording operation is conducted for the disc (magneto-optical disc) 1, a recording signal (analog audio signal) supplied to the terminal 17 is converted to a digital data by an A/D converter 18 and is thereafter supplied to the encoder/decoder 14 for the purpose of the audio compression encoding process. The recording data compressed by the encoder/decoder 14 is once written into the buffer RAM 13 by the memory controller 12, read out at a predetermined timing and is then sent to the encoder/decoder 8. After having completed the encoding process such as CIRC encoding and EFM modulation, etc. in the encoder/decoder 8, the recording data is then supplied to the magnetic head drive circuit 6.

The magnetic head drive circuit 6 supplies a magnetic head drive signal to the magnetic head 6a, depending on the encoded recording data. That is, the magnetic head 6a is caused to apply the magnetic field N or S to the magneto-optical disc 1. Moreover, in this case, the system controller 11 supplies a control signal to the optical head 3 to output the laser beam in the recording level.

The system controller 11 is composed of a microcomputer to control the operations of respective sections as explained above depending on the operations by user and internal programs.

The reference numeral 19 designates an operation input section provided with keys to be used by a user for the operations, while 20 designates a display unit composed, for example, of a liquid crystal display.

In the recording and reproducing apparatus, the data having completed the audio compression encoding in the encoder/decoder 14 for the recording operation is inputted to the memory controller 12 and is once stored in the buffer RAM 13 as explained above. In this case, the data is stored in units of one sector into the buffer RAM 13. For this processing, a data writing circuit system shown in FIG. 1 is formed in the memory controller 12.

Figure 1:
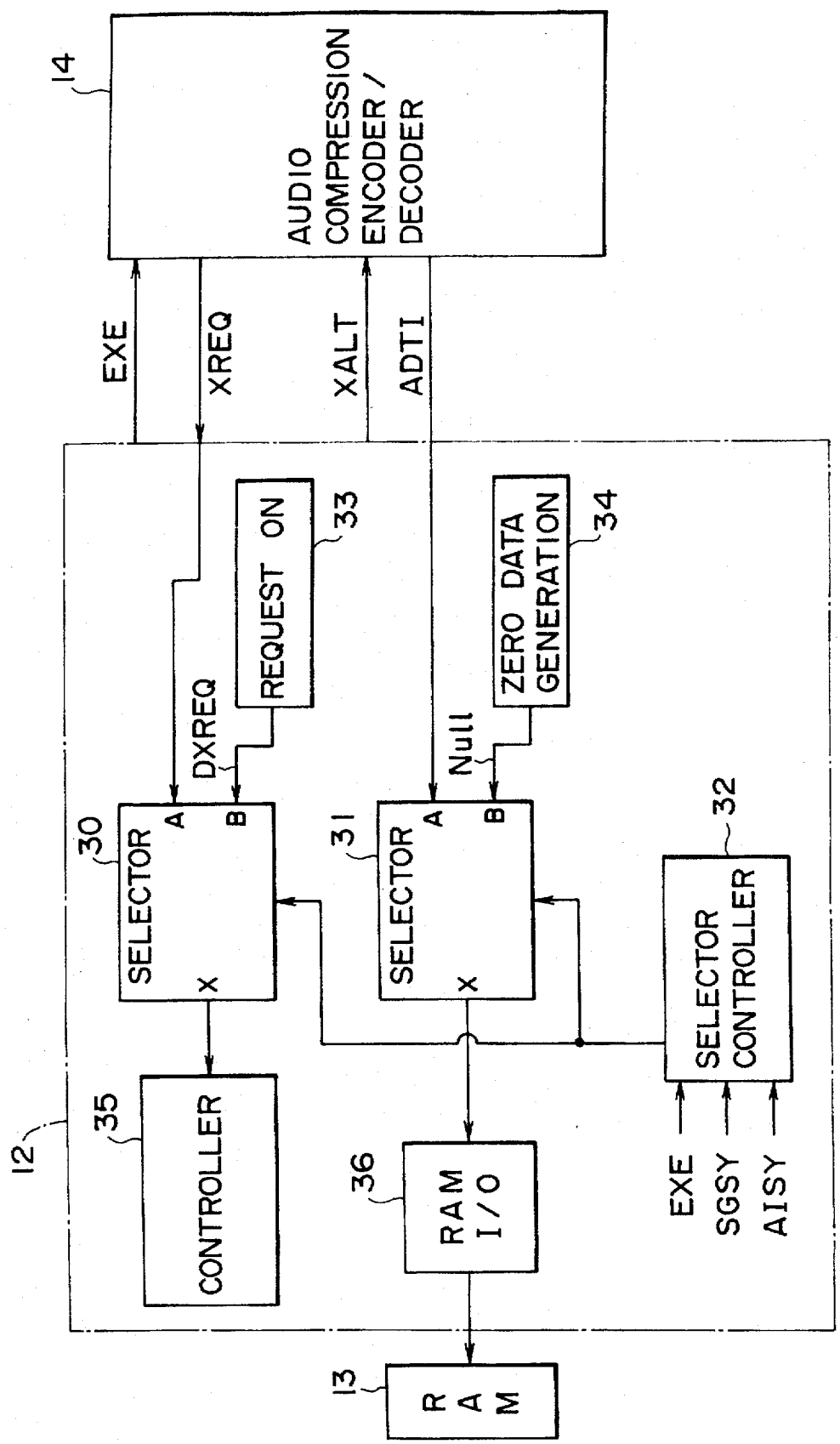
FIG. 1 is a block diagram of a memory controller as a preferred embodiment of the present invention.

An interface with the encoder/decoder 8, an interface with the system controller 11 and various circuits such as write/read address generator are also provided in the memory controller 12, in addition to the circuit compositions of FIG. 1, but these are not illustrated here.

The reference numerals 30, 31 designate selectors and inputs A, B are selected in common by the selector controller 32.

A data transfer request signal XREQ from the encoder/decoder 14 is supplied to the input A of the selector 30. While, a pseudo request signal DXREQ from a request signal generator 33 is supplied to the input B thereof.

An output of the selector 30 is supplied to a controller 35. The controller 35 performs a counting operation depending on the data transfer request signal XREQ or pseudo request signal DXREQ to generate a variety of timing signals in the memory controller 12.

The compressed data ADTI, that is, the data to be recorded in the disc is supplied to the A input of the selector 31 from the encoder/decoder 14. Moreover, the zero data Null is supplied to the B input from a zero data generator 34.

An output of the selector 31 is written into the buffer RAM 13 through a RAM interface 36. This data writing is carried out in units of the amount of data of one sector.

Although not illustrated, the data written into the buffer RAM 13 is read in units of one sector in the predetermined timing and is then supplied to the encoder/decoder 8 through the RAM interface 36 and is further supplied to the magnetic head drive circuit 6 through the CIRC/EFM encoding.

An audio compression encoding control signal EXE, a sound group transfer end signal SGSY and a sector data transfer end signal AISY are supplied to the selector controller 32 and the selectors 30, 31 are simultaneously controlled by these signals.

The audio compression encoding control signal EXE is also supplied to the encoder/decoder 14 to enter the transfer operation mode to transfer the data ADTI having completed the compression encoding. This audio compression encoding control signal EXE turns on when the recording and reproducing apparatus starts the recording operation.

The sound group transfer end signal SGSY is generated when the transfer of data ADTI in units of sound groups to the memory controller 12 from the encoder/decoder 14 is completed.

Meanwhile, the sector data transfer end signal AISY is generated when the transfer of data ADTI in units of sectors to the memory controller 12 from the encoder/decoder 14 is completed.

Operations of this memory controller 12 will now be explained hereunder with reference to FIG. 1 and FIG. 3.

First, when the recording and reproducing apparatus of this embodiment starts data recording to a disc 1, the audio compression encoding control signal EXE is turned on for the encoder/decoder 14. Moreover, when the audio compression encoding control signal EXE turns on, the selector controller 32 sets the selectors 30, 31 to the A input.

The encoder/decoder 14 outputs the data transfer request signal XREQ to the memory controller 12 for the audio compression encoding control signal EXE. The data transfer request signal XREQ is supplied to a controller 35 through the selector 30. The controller 35 sets the data receiving timing to supply a data latch signal XALT to the encoder/decoder 14.

This encoder/decoder 14 transfers the data ADTI to the memory controller 12 depending on the data latch signal XALT. The transferred data ADTI is then supplied to the RAM interface 36 from the selector 31 and is then written into the buffer RAM 13.

Thereafter, during continuation of the recording operation, the memory controller 12 outputs the data latch signal XALT depending on the data transfer request signal XREQ and the data ADTI is also transferred in the same manner.

Figure 3:
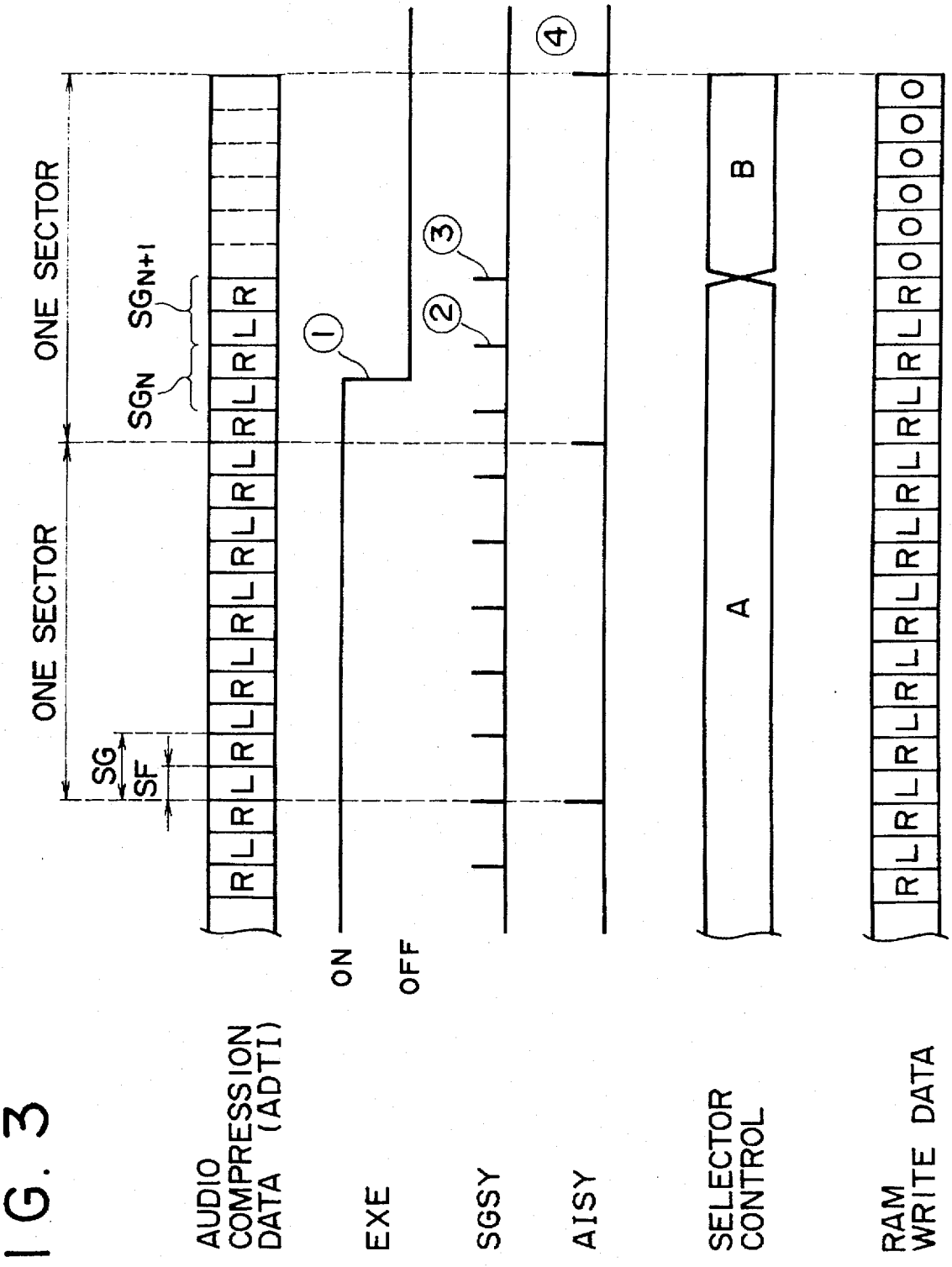
FIG. 3 is an explanatory diagram of operation timing of the preferred embodiment of the present invention.
Figure 4:
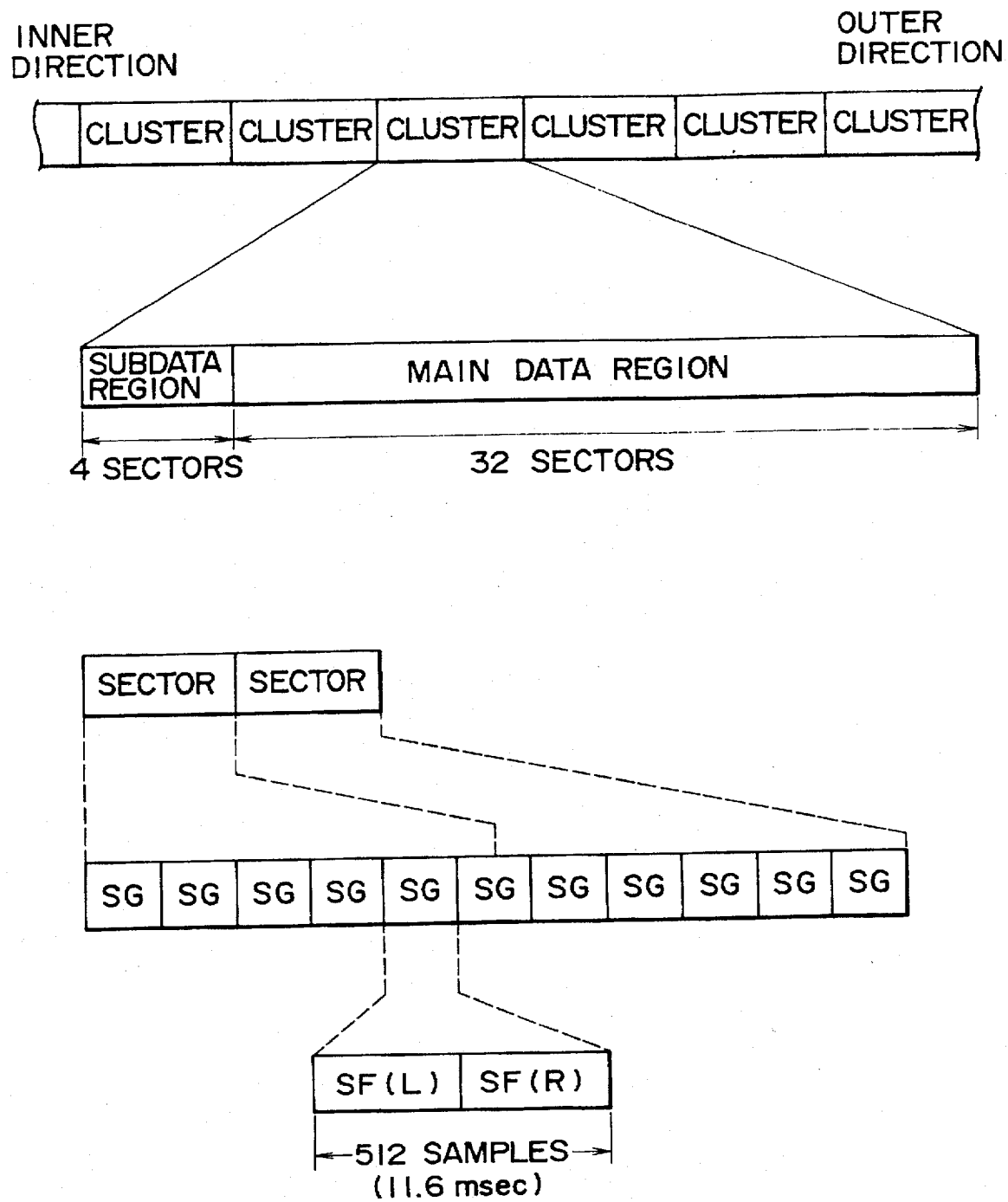
FIG. 4 is an explanatory diagram of a sector format of a minidisc.

Here, the operation timing when the recording operation is completed is illustrated in FIG. 3.

When the recording operation is completed in compliance with the recording end operation, the audio compression encoding control signal EXE is turned off as indicated by ① in FIG. 3.

When the audio compression encoding control signal EXE is turned off, the encoder/decoder 14 stops output of the data transfer request signal XREQ in such a timing that the transfer of the sound group $SG_N$ being transferred in above timing and the data ADTI which becomes the next sound group $SG_{N+1}$ is completed, namely, stops the transfer of the data ADTI.

Meanwhile, the memory controller 12 switches the selectors 30, 31 in such a timing that the transfer of data ADTI is completed.

That is, after the audio compression encoding control signal EXE is turned off, transfer of the data ADTI from the encoder/decoder 14 is completed in such a timing that two sound group transfer end signals SGSY indicated by ②, ③ in FIG. 3 are obtained.

Therefore, when two sound group transfer end signals SGSY indicated by ②, ③ are detected after detection of the off state of the audio compression encoding control signal EXE indicated by ①, the selector controller 32 switches the selectors 30, 31 to the B input.

Thereby, a pseudo request signal DXREQ is supplied to the controller 35 from a request signal generator 33 through the selector 30. Namely, even if the data transfer request signal XREQ transferred from the encoder/decoder 14 is lost, the controller 35 continues generation of a variety of timing signals for data writing into the buffer RAM 13.

On the other hand, the selector 31 selects the zero data Null from the zero data generator 34 and supplies this data to the RAM interface 36. Therefore, the zero data is stored in the buffer RAM 13, following the data ADTI of the last sound group $SG_{N+1}$ transferred.

Thereafter, this operation is continued until the sector data transfer end signal AISY is detected and when the sector data transfer end signal AISY indicated by ④ in FIG. 3 is detected, the data write operation to the buffer RAM 13 is completed.

Therefore, as shown in FIG. 3, the last one sector of the data to be written into the buffer RAM 13 is given the zero data until a perfect one sector of data is formed, following the data ADTI which is imperfect to form one sector of data transferred from the encoder/decoder 14. That is, data writing is executed in units of of complete sectors.

In this embodiment, as explained above, since the writing operation in units of of complete sectors to the buffer RAM 13 is carried out by the processes in the memory controller 12, the system controller 11 is no longer required to execute the processes for verifying the data transfer condition when the recording operation is completed, generating dummy data corresponding to the amount of data which is equal to the amount of shortage for the data of one sector and storing the dummy data to the buffer memory following the last transfer data. Thereby the processing load of the system controller 11 can be remarkably alleviated.

In the embodiment, the zero data is used as dummy data, but the other data such as a mute data can also be used as dummy data.

Moreover, in above explanation, the embodiment of the present invention is applied to a minidisc system, but the memory controller and recording apparatus of the present invention can also be employed in the other systems.

In addition, the structure of memory controller is not limited only to that shown in FIG. 1 and also allows various modifications.

As explained above, since the present invention executes the processing to add the dummy data to satisfy the predetermined data amount unit when the input is completed in the case of storing the input data to the memory in units of the predetermined data amount, the microcomputer which is totally controlling the entire operations can be freed from the processes to verify the data transfer condition when the operations are completed and to generate and store the dummy data, resulting in the effect that the processing load thereof can be remarkably alleviated. Thereby, more easier design of the system program can also be realized.

What is claimed is:

1. A memory controller for storing input data into a memory in units of sectors, comprising:

dummy data generating means for generating dummy data;

selector means for selectively supplying input data or the dummy data sent from said dummy data generating means to the memory; and selector control means for switching said selector means, if the supply of input data is stopped before the amount of data reaches a complete sector while the input data is supplied to the memory through said selector means, and to supply data from said dummy data generating means to the memory until the total amount of data stored in the memory reaches a complete sector.

2. A recording apparatus for recording predetermined data to a recording medium in units of complete sectors, comprising:

input means for inputting data:

storing means for storing the predetermined data input by the input means;

dummy data generating means for generating dummy data;

selector means for selectively supplying input data from the input means or dummy data transferred from said dummy data generating means to the storing means; and selector control means for controlling said selector means so that the dummy data is supplied to said storing means from said dummy data generating means until the total amount of data reaches the predetermined data amount unit, if the supply of said input data from the input means is stopped before the amount of the input data reaches a complete sector while said input data is being supplied to said storing means through said selector means; and recording means for recording said predetermined data stored in said storing means to a recording medium in units of a complete sector.

3. A memory controller for storing input data into a memory in units of sectors, comprising:

dummy data generating means for generating dummy data in the form of a muting signal;

first selector means for selectively supplying other input data or the dummy data sent from the dummy data generating means to the memory;

dummy request signal generating means for generating a dummy data request signal;

second selector means for selectively supplying either a data request command signal or a dummy request signal from the dummy request signal generating means;

a controller for generating timing signals which are sent to the memory controller in accordance with either the dummy request signal or the request command signal;

selector control means for switching the first selector means and the second selector means, if the supply of input data is stopped before the amount of data reaches a complete sector while input data is supplied to the memory through the first selector means, and to supply data from the dummy data generating means via the first selector means to the memory and to supply the dummy data request signal from the dummy request signal generating means via the second selector means to the controller until the total amount of data stored in the memory reaches a complete sector.

* * * * *